US010597938B2

(12) United States Patent
Tan

(10) Patent No.: US 10,597,938 B2
(45) Date of Patent: Mar. 24, 2020

(54) CURTAIN MOUNTING UNIT

(71) Applicant: NINGBO LIYANG NEW MATERIAL COMPANY LIMITED, Ningbo (CN)

(72) Inventor: Baoguo Tan, Ningbo (CN)

(73) Assignee: NINGBO LIYANG NEW MATERIAL COMPANY LIMITED, Ningbo (CN)

( * ) Notice: Subject to any disclaimer, the term of this patent is extended or adjusted under 35 U.S.C. 154(b) by 0 days.

(21) Appl. No.: 16/168,251

(22) Filed: Oct. 23, 2018

(65) Prior Publication Data

US 2019/0162023 A1 May 30, 2019

(30) Foreign Application Priority Data

Nov. 29, 2017 (CN) .................... 2017 2 1626268 U

(51) Int. Cl.

| | |
|---|---|
| ***F16M 11/00*** | (2006.01) |
| ***E06B 9/42*** | (2006.01) |
| ***E06B 9/50*** | (2006.01) |
| ***E06B 9/323*** | (2006.01) |
| ***A47H 1/12*** | (2006.01) |
| ***A47H 1/14*** | (2006.01) |
| *E06B 9/40* | (2006.01) |

(52) U.S. Cl.
CPC ................ *E06B 9/42* (2013.01); *A47H 1/12* (2013.01); *A47H 1/14* (2013.01); *E06B 9/323* (2013.01); *E06B 9/50* (2013.01); *E06B 2009/402* (2013.01)

(58) Field of Classification Search
CPC .............. A47K 3/38; A47H 13/04; E06B 9/62
See application file for complete search history.

(56) References Cited

U.S. PATENT DOCUMENTS 8,479,932 B2 * 7/2013 Carney .................. A47H 1/022
211/105.5
10,138,676 B2 * 11/2018 Bohlen ..................... E06B 9/62

* cited by examiner

*Primary Examiner* — Amy J. Sterling
(74) *Attorney, Agent, or Firm* — W&K IP

(57) ABSTRACT

The present disclosure disclose a curtain mounting unit which comprises a connecting seat having a receiving cavity formed in a rear end surface, a mounting hole connected with the receiving cavity formed in a front end surface, and a plurality of tenons extending along a longitudinal direction of connecting seat on the outer sides of the connecting seat. The curtain mounting unit has a telescopic tube having external thread arranged outside and a front end to insert into the receiving cavity which comprises an elastic component. The two ends of the elastic component may be abutting against the front end of the telescopic tube and an inner bottom surface of the receiving cavity respectively. The curtain mounting unit has an annularly-shaped locking ring fitted on the outer surface of the telescopic tube.

5 Claims, 2 Drawing Sheets

CURTAIN MOUNTING UNIT

CROSS-REFERENCE TO RELATED APPLICATIONS

This application claims priority to Chinese Patent Application No. 201721626268.1 with a filing date of Nov. 29, 2017. The content of the aforementioned applications, including any intervening amendments thereto, are incorporated herein by reference.

TECHNICAL FIELD

The present disclosure relates to the field of curtain components, and more particularly, to a curtain mounting unit.

BACKGROUND

Roller blinds, also known as roll-up curtains, are named for rolling the entire curtain up and down in contrast to the traditional curtains which are opened laterally. Roll-up curtains are used in various constructions as a commonly seen type of office curtains. According to the different operation modes, they can be divided into beaded roller blinds, spring-loaded roller blinds and electric roller blinds. At present, the installation of the roller blind is generally performed by fixing two brackets to the wall by using fixing members such as screws and bolts. The operation would inevitably damage the surface of the wall and cause inconvenience for the user.

SUMMARY

One objective of the present disclosure is to solve the problem of the prior arts by providing a curtain mounting unit which avoids damaging the wall and allows more expedient installation.

In one embodiment, a curtain mounting unit is disclosed which comprises a connecting seat having a receiving cavity formed in a rear end surface, a mounting hole connected with the receiving cavity formed in a front end surface, and a plurality of tenons extending along a longitudinal direction of connecting seat on the outer sides of the connecting seat. The curtain mounting unit has a telescopic tube having external thread arranged outside and a front end to insert into the receiving cavity; an elastic component received in the receiving cavity. The two ends of the elastic component may be abutting against the front end of the telescopic tube and an inner bottom surface of the receiving cavity respectively. The curtain mounting unit has an annularly-shaped locking ring fitted on the outer surface of the telescopic tube. The locking ring may have central via and inner thread on the inner side wall of the central via to engage the outer thread. The curtain mounting unit further has a mounting plate attached to a rear end of the telescopic tube.

In one embodiment, the outer sides of the connecting seat comprise two symmetrically arranged sliding grooves connecting with the receiving cavity in the longitudinal direction, and the front end of the telescopic tube comprises two sliders matched with the shapes of the sliding grooves. The two sliders are embedded in the sliding grooves respectively.

In one embodiment, the telescopic tube comprises a double-ear component disposed on the rear end surface. The double ears of the double-ear component insert into two square grooves formed through the mounting plate and hinge to the mounting plate by a pin.

In one embodiment, the elastic component is a spring.

In one embodiment, a curtain comprises two curtain mounting units as discussed above and a frame body.

In one embodiment, a mounting method of the curtain as discussed above comprises inserting one curtain mounting unit into each end of the frame body.

In one embodiment, the mounting method comprises rotatably mounting two curtain mounting units in the frame body through mounting holes provided at the front end of the connecting seat, partially extending the telescopic tube into the receiving cavity by the elastic component, and rotating the locking ring until it abuts against the rear end of the connecting seat to prevent the telescopic tube from retracting into the receiving cavity.

The curtain mounting unit can be directly inserted into the frame body and abutted against two opposite walls by the connecting seat, the elastic component, the telescopic tube, the locking ring and the mounting plate which are assembled together in sequence when installing a curtain between the walls. The locking ring used for the locking and the fixation eliminates the need for using screws and bolts, which might damage the surface of the walls. The embodiments allow the curtain to have fewer components, and use of the curtain would be more expedient.

BRIEF DESCRIPTION OF THE DRAWINGS

The skilled in the art would more profoundly understand the technical solution of the present disclosure upon reading the following embodiment with reference taken to the accompanying drawings, in which.

DETAILED DESCRIPTION

Figure 1:
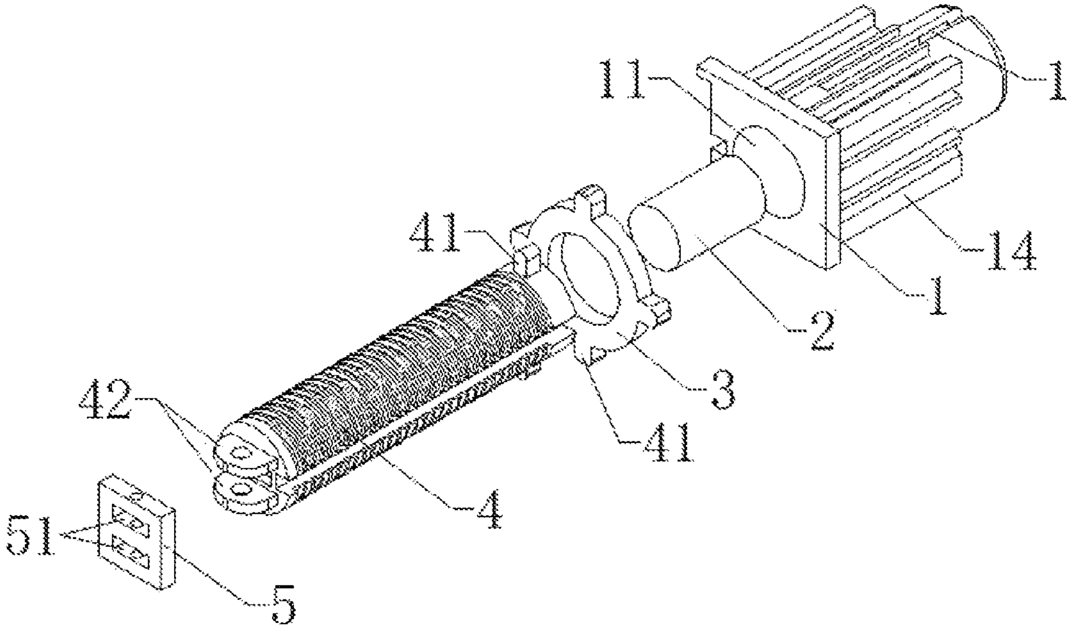
FIG. 1 is a perspective view of a curtain mounting unit of an embodiment.
Figure 2:
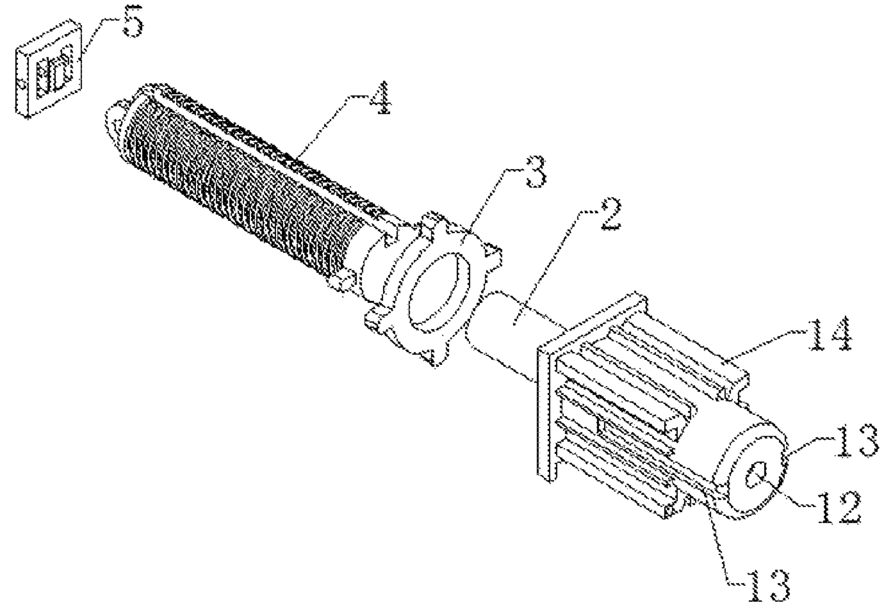
FIG. 2 is another perspective view of a curtain mounting unit of an embodiment.
Figure 3:
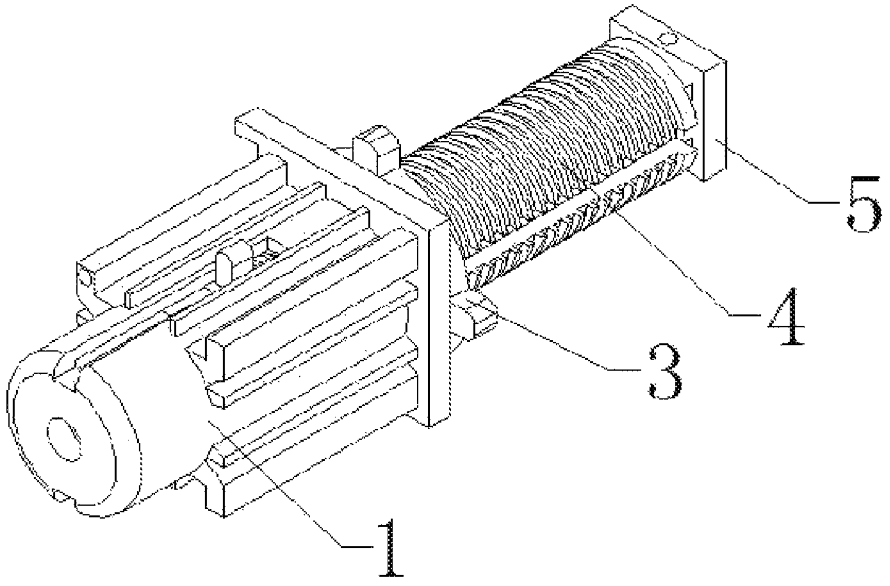
FIG. 3 is a perspective view of an installed curtain mounting unit of an embodiment.
Figure 4:
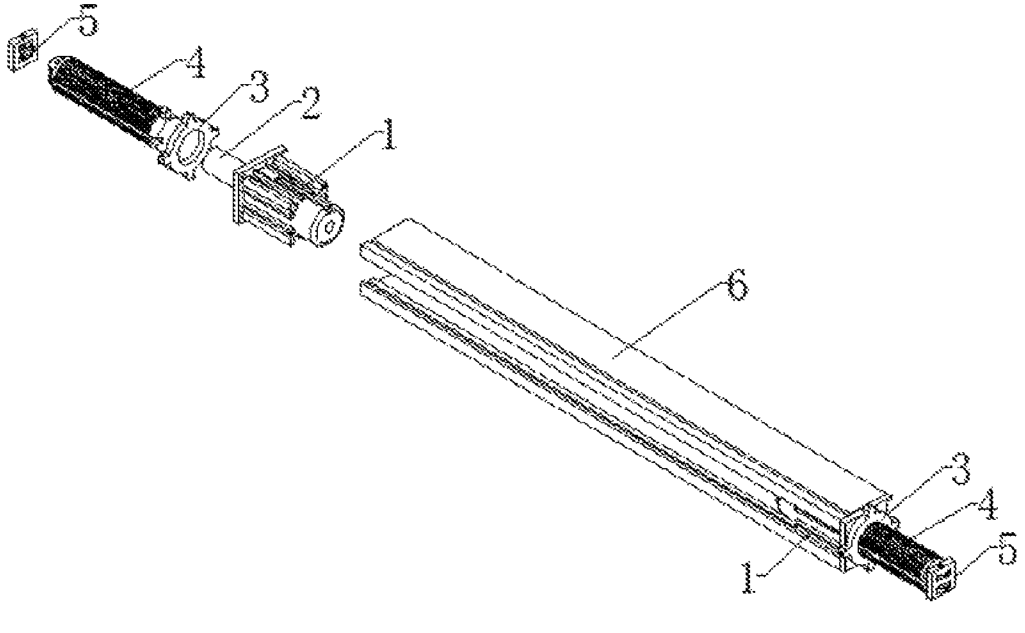
FIG. 4 is a perspective view of a part of a curtain comprising two curtain mounting units and a frame body of an embodiment.

Various aspects of the illustrative embodiments of the present disclosure will be described herein using terms commonly employed by those skilled in the art. Alternate embodiments may be practiced by the skilled in the art under the scope and the principle of the disclosed embodiments. In other instances, well-known features are omitted or simplified in order not to obscure the illustrative embodiments. The curtain mounting unit is viewed in different viewing angles in FIGS. 1 and 2. FIG. 3 is a perspective view of a curtain mounting unit which has been installed. FIG. 4 is a perspective view of a part of an installed curtain comprising two curtain mounting units and a frame body. Part of the structures may be omitted from the drawing, and other parts of the structures can be shown in perspective views or cross-sectional views. Of the two ends on each of the two curtain mounting units mounted on the frame body, the end facing towards each other is defined as the front end of the embodiment, and the end facing away from each other is defined as the rear end of the embodiment.

As shown in FIGS. 1-4, a curtain mounting unit of an embodiment comprises a connecting seat 1 having a receiving cavity 11 formed in a rear end surface. A mounting hole 12 connected with the receiving cavity 11 is formed in a front end surface. Other components of the curtain can be clamped between two oppositely arranged connecting seats 1. A plurality of tenons 14 extending along a longitudinal direction of connecting seat 1 are arranged on the outer sides of the connecting seat 1. The curtain mounting unit also includes a telescopic tube 4 which has external thread arranged outside and a front end to insert into the receiving cavity 11. The curtain mounting unit also includes an elastic component 2 received in the receiving cavity 11. The two ends of the elastic component 2 abut against the front end of the telescopic tube 4 and an inner bottom surface of the receiving cavity 11 respectively. The curtain mounting unit also includes an annularly-shaped locking ring 3 fitted on the outer surface of the telescopic tube 4. The locking ring 3 has a central via and inner thread on the inner side wall of the central via to engage the outer thread. It is used to rotate until pressing against the rear end surface of the connecting seat 1 to lock the telescopic tube 4 back inside the receiving cavity 11 and prevent the radial movement of the telescopic tube 4 inside the receiving cavity 11. The curtain mounting unit further includes a mounting plate 5 attached to a rear end of the telescopic tube 4 to attach to a wall.

During installation of a curtain, one curtain mounting unit is inserted into each end of a frame body 6 as shown in FIG. 4. The front ends of the two curtain mounting units clamp the body of a curtain in between. The body of the curtain may comprise a roller blind cylinder, a curtain cloth wound around the outer circumference of the roller blind cylinder, a bead curtain brake disposed at both ends of the roller blind cylinder, and a driven rotator, although not shown in the figures. Both the bead curtain brake and the driven rotator can be commonly used structures, which are mounted in the frame body 6 through the mounting holes 12 opened at the front end of the connecting seat 1 to realize a rotatable function. The frame body 6 may have an "n" shape in general. The curtain cloth may hang downwards from an opening on a lower part of the frame body 6. In this embodiment, the installed curtain comprises a frame body 6 and two curtain mounting units. The two mounting plates 5 abut against walls on both sides of the frame body 6. Due to the presence of the elastic component 2, part of the front end of telescopic tube 4 would insert into the receiving cavity 11 according to the interval between the walls. Traditionally, the overall length of the frame body 6 has to be modified before the installation begins. A proper size has to be predetermined based on measurements before the installation. This embodiment eliminates such needs by inserting the front end of the telescopic tube 4 into the receiving cavity during installation. Once the position for installation has been confirmed, the telescopic tube 4 would be released and extend backwards until it reaches the wall with the aid of the elastic component 2. Then, the locking ring 3 is rotated until its front end contacts with the rear end of the connecting seat 1. The telescopic would be prevented from retracting back into the receiving cavity 11.

Based on the discussion above, the curtain mounting unit may comprise a connecting seat 1, an elastic component 2, a telescopic tube 4, a locking ring 3, and a mounting plate 5 which are connected in sequence, such that the curtain mounting unit can be directly inserted into the frame body 6 and fixed between two opposite walls by the locking ring 3. The installation would be more expedient since components that might damage the walls, such as bolts and screws, are not longer needed.

In an embodiment, the outer sides of the connecting seat 1 comprise two symmetrically arranged sliding grooves 13 connecting with the receiving cavity 11 in the longitudinal direction. The front end of the telescopic tube 4 comprises two sliders 41 matched with the shapes of the sliding grooves 13. The two sliders 41 are embedded in the two sliding grooves 13 respectively. Therefore, two limiting positions for limiting the longitudinal movement of the telescopic tube 4 are defined to avoid detachment of the telescopic tube 4 from the connecting seat 1.

In an embodiment, the telescopic tube 4 comprises a double-ear component 42 disposed on the rear end surface. The double ears of the double-ear component 42 insert into two square grooves 51 formed through the mounting plate 5. The double ears of the double-ear component 42 are also hinged to the mounting plate 5 by a pin. The mounting plate 5 may rotate relatively to the telescopic tube 4 to adapt to an uneven wall surface. The elastic component 2 can be a spring.

Although certain embodiments have been illustrated and described herein for purposes of description, a wide variety of alternate and/or equivalent embodiments or implementations to achieve the same purposes may be substituted for the embodiments shown and described without departing from the scope of the present disclosure. This application is intended to cover any adaptations or variations of the embodiments discussed herein.

I claim:

1. A curtain mounting unit, comprising:

a connecting seat (l) having a receiving cavity (11) formed in a rear end surface, a mounting hole (12) connected with the receiving cavity (11) formed in a front end surface, and a plurality of tenons (14) extending along a longitudinal direction of connecting seat (1) on the outer sides of the connecting seat (1);

a telescopic tube (4) having external thread arranged outside and a front end to insert into the receiving cavity (11);

an elastic component (2) received in the receiving cavity (11), the two ends of the elastic component (2) abutting against the front end of the telescopic tube (4) and an inner bottom surface of the receiving cavity (11) respectively, wherein the elastic component is capable of expanding and contracting along a longitudinal direction;

an annularly-shaped locking ring (3) fitted on the outer surface of the telescopic tube (4) having a central via, and inner thread on the inner side wall of the central via to engage the outer thread; and a mounting plate (5) attached to a rear end of the telescopic tube (4).

2. The curtain mounting unit of claim 1, wherein the outer sides of the connecting seat (1) comprise two symmetrically arranged sliding grooves (13) connecting with the receiving cavity (11) in the longitudinal direction; and wherein the front end of the telescopic tube (4) comprises two sliders (41) matched with the shapes of the sliding grooves (13), the two sliders (41) embedded in the sliding grooves (13) respectively.

3. The curtain mounting unit of claim 2, wherein the telescopic tube (4) comprises a double-ear component (42) disposed on the rear end surface; and wherein the double ears of the double-ear component (42) insert into two square grooves (51) formed through the mounting plate (5) and hinge to the mounting plate (5) by a pin.

4. The curtain mounting unit of claim 3, wherein the elastic component (2) is a spring.

5. A curtain, comprising two curtain mounting units of claim 4, and a frame body (6).

* * * * *